United States Patent [19]

Hiraoka et al.

[11] 4,139,139
[45] Feb. 13, 1979

[54] PROCESS FOR MANUFACTURING BUTT-WELDED STEEL PIPE

[75] Inventors: Nobuaki Hiraoka; Syuji Matumoto, both of Amagasaki, Japan

[73] Assignee: Sumitomo Kinzoku Kogyo Kabushiki Kaisha, Osaka, Japan

[21] Appl. No.: 856,814

[22] Filed: Dec. 1, 1977

[30] Foreign Application Priority Data

Dec. 12, 1976 [JP] Japan .................. 51-148911

[51] Int. Cl.² .......................... B23K 31/06
[52] U.S. Cl. ..................... 228/102; 228/147
[58] Field of Search ............ 228/102, 103, 147, 8

[56] References Cited

U.S. PATENT DOCUMENTS 3,145,676 8/1964 Caplan .................... 228/147
3,409,198 11/1968 Peterman, Sr. ............ 228/103 X

FOREIGN PATENT DOCUMENTS 31664 3/1976 Japan ..................... 228/102

*Primary Examiner*—Al Lawrence Smith
*Assistant Examiner*—K. J. Ramsey
*Attorney, Agent, or Firm*—Ladas, Parry, Von Gehr, Goldsmith & Deschamps

[57] ABSTRACT

In a butt-welded steel pipe manufacturing equipment, an edge portion temperature and a center portion temperature of a steel strip are detected at a location between the outlet of a heating furnace and the inlet of a butt-welding mill. The heating condition of the steel strip in the heating furnace is controlled in accordance with the difference between the edge portion temperature and a target edge portion temperature, and the transporting speed of the steel strip is controlled in accordance with the difference between the edge portion temperature and the center portion temperature and with the difference between the target edge portion temperature and a target center portion temperature.

3 Claims, 7 Drawing Figures

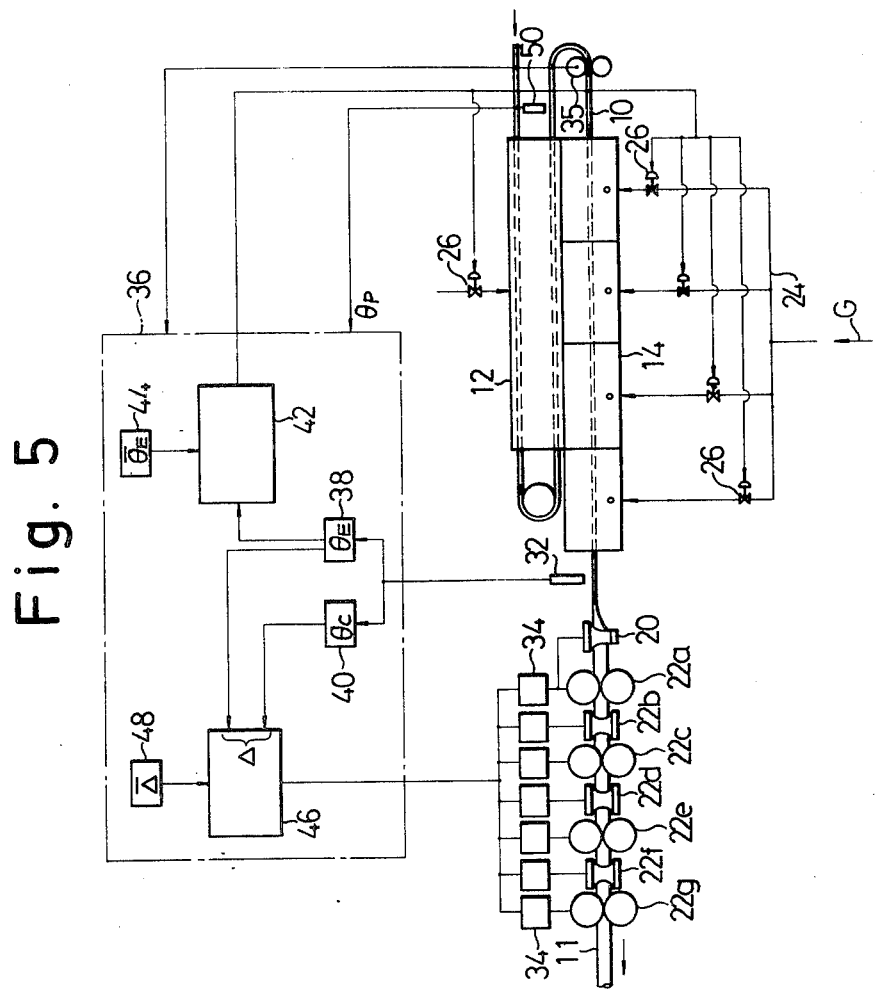

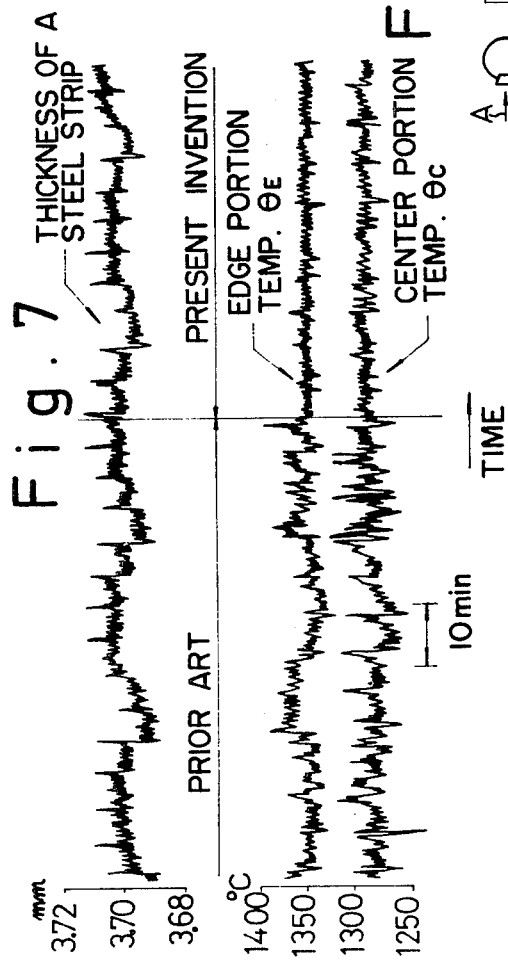
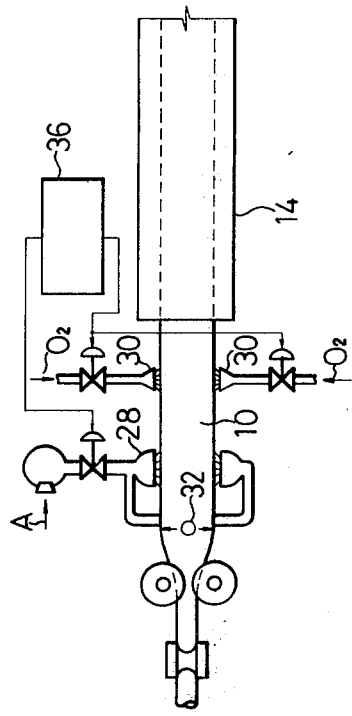

PROCESS FOR MANUFACTURING BUTT-WELDED STEEL PIPE

FIELD OF THE INVENTION

This invention relates to a process for manufacturing a butt welded steel pipe and, particularly, to a process for maintaining the butt-welding temperature of a steel strip at an optimum temperature by detecting an edge portion temperature and a center portion temperature of the steel strip at a location between the outlet of a heating furnace and the inlet of a butt-welding mill, and by controlling the heating condition and the transporting speed of the steel strip in accordance with the difference between the detected temperatures and the optimum target temperatures.

DESCRIPTION OF THE PRIOR ARTS

In manufacturing a butt-welded steel pipe, the temperature of a steel strip supplied into a forge-welding mill is known to constitute a factor controlling directly the quality of the final product. Thus, the temperature of a steel strip has been controlled in accordance with the target value obtained from pre-production tests or the like.

As described in Japanese patent application 105765/1974 (Japanese Patent Disclosure No. 31664/1976), either one of the following processes has been utilized for controlling the temperature of the steel strip:

(1) A process for controlling the transporting speed of the steel strip by feed-backing the difference between the target temperature and the temperature of the steel strip detected at the inlet of the forge-welding mill.

(2) A process for controlling the heating condition in the heating furnace by feed-backing the difference between the target temperature and the temperature of the steel strip detected at the inlet of the forge-welding mill.

However, with reference to the temperature of the steel strip at the inlet of the forge-welding mill, for example, the prior art method is insufficient and is not suitable in which the temperature of the steel strip is detected visually or by a thermometer, and the transporting speed or the heating condition is controlled in accordance with the difference between the detected temperature and a target temperature. Since the thickness of the steel strip varies to large extent in the lengthwise direction, not only the temperature level of the steel strip but also the temperature gradient in the widthwise direction of the steel strip will greatly vary in a short period in accordance with the variation in the thickness thereof even though the heating condition or the transporting speed of the steel strip is controlled. This makes the butt welding condition unstable. Nevertheless, the temperature contol according to the prior art has been performed without considering temperature gradient of the steel strip in the widthwise direction at the inlet of the butt-welding mill.

The prior art process described as above is, in any cases, based on the temperature of the steel strip at the inlet of the butt-welding mill, but since the temperature of the steel strip has been detected at a single point in the widthwise direction of the steel strip, there has been a problem in so-called "one-point control".

In other words, the steel strip has a temperature gradient in the widthwise direction and, as shown in FIG. 1, there has been observed a substantial temperature difference $\Delta$ between the center portion temperature $\theta_C$ of the steel strip and the edge portion temperature $\theta_E$. FIG. 2 shows the variation in the temperature difference between the center portion temperature and the edge portion temperature in conjunction with the thickness of the steel strip even though the edge portion temperature is maintained at a constant.

Therefore, the prior art "one point control" process cannot attain the required condition for obtaining the desired butt-welding characteristics, namely, (1) optimum uniformity in the edge portion temperature $\theta_E$ of the steel strip, and (2) optimum uniformity in the upsetting force (which is equivalent to the optimum uniformity in the temperature difference $\Delta$ between the edge portion temperature $\theta_E$ and the center portion temperature $\theta_C$).

The present invention provides an improved controlling method so as to overcome the shortcomings of the one point control as mentioned hereinabove.

When the fuel supplied into the heating furnace is maintained at a constant, the edge portion temperature $\theta_E$ and the center portion temperature $\theta_C$ of the steel strip at the inlet of the butt-welding mill will change as shown in FIG. 3 in accordance with the transporting speed of the steel strip. It is clear that the transporting speed has a little influence on the edge portion temperature $\theta_E$, but it has a substantial influence on the center portion temperature $\theta_C$.

The influence of fuel supply (for example, cokes furnace gas flow in the final zone of the heating furnace) on $\theta_E$ and $\theta_C$ when the transporting speed of the steel strip is a constant is shown in FIG. 4. In FIG. 4, conversely to FIG. 3, the change in $\theta_E$ is remarkable while $\theta_C$ does not change substantially. In this respect, it is appreciated that the edge portion temperature varies substantially in accordance with the amount of the fuel supply on account of the effect of the forced convectional transmittion, and the center portion temperature varies substantially in accordance with the transporting speed of the steel strip on account of the effect of radiant transmittion. The present invention advantageously utilizes the phenomenom.

BRIEF SUMMARY OF THE INVENTION

One object of the present invention is to provide a process for manufacturing butt-welded steel pipes having good forgibility by controlling $\theta_E$ and $\Delta$ simultaneously.

Another object of the present invention is to attain the optimum control and to obtain a clarified standard for control by detecting the edge portion temperature and the center portion temperature of the steel strip, instead of detecting temperature of the steel strip at one point thereof.

A further object of the present invention is to control strictly the butt-welding temperature by controlling heating condition of the heating furnace on the basis of the edge portion temperature of the steel strip.

A still further object of the present invention is to improve forgibility of the steel pipe by controlling the temperature difference between the edge portion temperature and the center portion temperature of the steel strip for ensuring the optimum temperature difference, and holding the upsetting force to be stable.

BRIEF DESCRPTION OF THE DRAWINGS

These and other object of the present invention will be apparent from the following detailed description with reference to the attached drawings showing a preferred embodiment including specific parts and arrangement of parts. It is intended that the drawings included as part of this specification be illustrative of the preferred embodiment of the present invention and should in no way be considered as a limitation on the invention itself.

FIG. 4 is a diagram showing the change in the temperature of the edge portion and the center portion of the steel strip with reference to the change in the fuel supply when the transporting speed of the steel strip is maintained at a constant;

FIG. 5 is a view showing an apparatus for utilizing the present invention;

FIG. 6 is a plan view of the apparatus of FIG. 5; and

FIG. 7 is a diagram showing the change in temperature of the edge portion and the center portion of steel strip according to the present invention and to the prior art device.

DETAILED DESCRIPTION OF THE PREFERRED EMBODIMENT

Figure 1:
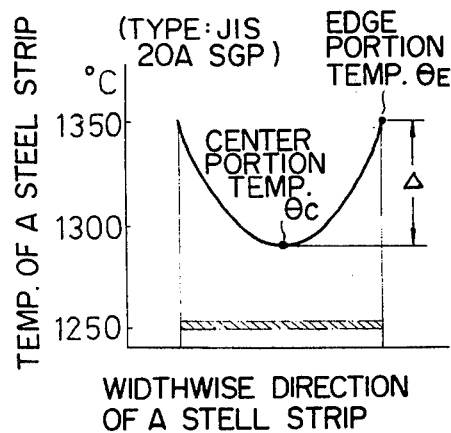
FIG. 1 is an exemplary diagram showing the different between the edge portion temperature and the center portion temperature of a steel strip at the inlet of butt-welding mill.
Figure 2:
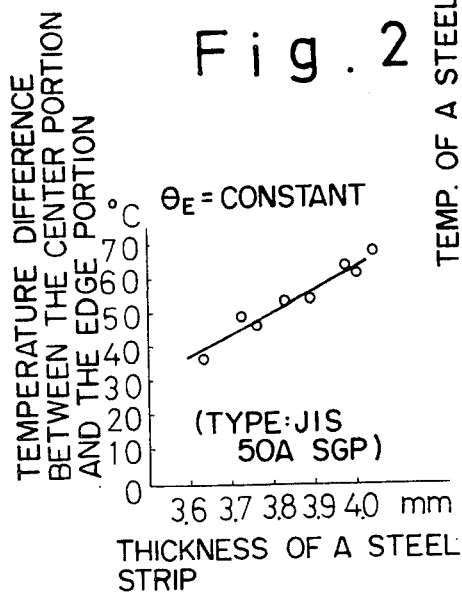
FIG. 2 is an exemplary diagram showing change in the temperature difference between the edge portion and the center portion of a steel strip with reference to change in the thickness of the steel strip.
Figure 3:
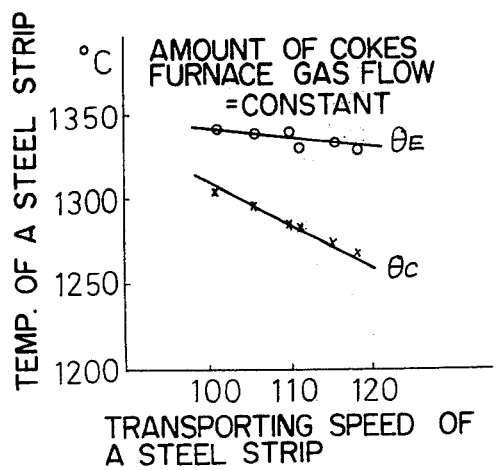
FIG. 3 is a diagram showing the change in the temperature of the edge portion and the center portion of a steel portion with reference to the change in the transporting speed of the steel strip when the fuel supply is maintained at a constant.

FIG. 5 shows a preferred embodiment of the present invention, in which, a steel strip 10 is preheated in a preheating furnace 12 and is heated to a predetermined temperature in a heating furnace 14, thereafter, is formed into a butt-welded steel pipe 11 in a forge-welding mill consisting of a forming roll 20 and reducing rolls 22a, 22b, 22c, 22d, 22e, 22f and 22g.

The preheating furnace 12 and the heating furnace 14 is controlled at each zone thereof, wherein the amount of gas flow supplied to the furnaces through gas supplying tubes 24 is controlled by adjusting the opening of adjusting valves 26 disposed in a gas supplying tubes 24.

Air blow-out edge blowers 28 are disposed between the outlet of the heating furnace 14 and the inlet of the butt-welding mill so as to blow air A against opposite edges of the steel strip 10. Further, a pair of oxygen $O_2$ blow-out horns 30 are disposed to blow oxygen $O_2$ against opposite edges of the steel strip 10. A temperature detector 32 is disposed at the inlet of the butt-welding mill, and is adapted to scan the steel strip 10 in the direction transversal thereto by means of a mechanism (not shown) moving across the steel strip 10, whereby the temperature of the steel strip can be detected at any point or at several points between the opposite edge portions of the steel strip 10. According to the present invention, edge portion temperature $\theta_E$ and center portion temperature $\theta_C$ are detected by the detector 32.

The rolls of the butt-welding mill are driven by motors 34, and the transporting speed of the steel strip 10 and the welded steel pipe 11 is detected by a speed meter 35 and controlled by rotational speed of the motors 34, 34, ..., in accordance with the detected signal.

Utilizing the apparatus having the construction aforementioned, welded steel pipe 11 is manufactured in the following manner. In FIG. 5, the edge portion temperature $\theta_E$ and the center portion temperature $\theta_C$ of the steel strip 10 are detected by the temperature sensor 32, and are supplied into a central processor unit 36 in the form of temperature data 38, 40. The edge portion temperature data 38 is supplied into a computer 42, which receives a target edge portion temperature $\bar{\theta}_E$ from a target edge portion temperature register 44 and compares it with $\theta_E$ to calculate the difference $(\bar{\theta}_E - \theta_E)$ and adjusts the opening of the valves 26, thereby controlling the heating condition of the heating furnace 14 so as to obtain the target temperature $\bar{\theta}_E$ at the edge portion of the steel strip 10.

Whereas, the edge portion temperature data 38 and the center portion temperature data 40 are supplied into a computer 46 which, in turn, calculates the difference $\Delta$ therebetween and compares the difference $\Delta$ with a target $\bar{\Delta}$ supplied from a target temperature difference register 48, and adjusts the drive motors 34, 34 ... based upon the $(\bar{\Delta} \sim \Delta)$, whereby the transporting speed of the steel strip 10 and the welded steel pipe 11 are feedback controlled.

Thus, the edge portion temperature $\theta_E$ of the steel strip 10 can be maintained at the target temperature $\bar{\theta}_E$ to optimize the butt-welding temperature, and the temperature difference $\Delta$ can be adjusted to the target temperature difference $\bar{\Delta}$ by controlling the transporting speed of the steel strip 10, whereby it is easy to obtain a preferred suitable upsetting force. In other words, reliable and worthy butt-welded steel pipes can be manufactured by controlling the temperature $\theta_E$ and the temperature difference $\Delta$ simultaneously.

FIG. 7 is exemplary data showing remarkable effects and advantages of the present invention. In FIG. 7, the wave line upwards of the central transverse solid line shows the change in the thickness of the steel strip 10. The two lower wave lines are respectively the edge portion temperature $\theta_E$ (upper wave line) and the center portion temperature $\theta_C$, and the leftside of the vertical solid line shows data obtained from the prior art method and the rightside shows the data according to the present invention.

The drawing shows that change in the edge portion temperature of the steel strip is reduced to 15° C. from 40° C. in the prior art method, and the change in the temperature difference between the center portion and the edge portion is reduced to 10° C. as compared with 30° C. in the prior art method. The cracks or the wrinkles observed in the final products are decreased substantially.

There disposed a hot steel temperature detector 50 and a speed meter 35 between the outlet of preheating furnace 12 and the inlet of the heating furnace 14, and the temperature $\theta_P$ and the speed $V_O$ of the steel strip 10 therein are supplied into the central processor unit 36. In comparing the preheating temperature $\theta_P$ with the temperature $\theta_E$ or $\theta_C$, it is found that the change in the preheating temperature $\theta_P$ is similar to the change in the temperature $\theta_E$ or $\theta_C$ of the steel strip 10 although there is a difference in the level of temperature and in the phase according to the time lag. Therefore, it is possible to utilize the preheating temperature $\theta_P$ and the speed $V_O$ being supplied into the central processor unit 36 for predicting the edge portion temperature $\theta_E$ and/or the center portion temperature $\theta_C$, thereby controlling the heating condition of the heating furnace 12 and the transporting speed of the steel strip 10 according to the predicted temperatures $\theta_E$ and $\theta_C$.

The oxygen blow-out horns 30 are, as shown in FIG. 6, provided for blowing oxygen $O_2$ against the edge portions of the steel strip 10 in addition to the air blow-out blowers 28 for improving responsivity in heating the edge portions of the steel strip 10, whereby the temperature difference between the opposite end portions of the steel strip can be minimized. The horns 30 act as auxiliary means for controlling the temperature of the edge portions of the steel strip 10.

As heretofore described in detail, the process according to the present invention attains the preferable forgibility by detecting temperature of the steel strip at the inlet of the butt-welding mill at the edge portion and at the center portion thereof, calculating the difference therebetween, controlling and adjusting the amount of fuel supply in accordance with the difference between the detected edge portion temperature and a target edge portion temperature, and controlling and adjusting the transporting speed of the steel strip in the butt-welding mill in accordance with the difference between the calculated temperature difference and a target temperature difference. Therefore the process is performed according to "two points control" principle which enables to control the amount of fuel supply and the transporting speed of the steel strip automatically and simultaneously in response to the change in the thickness of the steel strip and to the change in the temperature gradient of the steel strip in the widthwise direction, which cannot be attained according to the prior art process. Therefore, it is possible to overcome the shortcomings in the prior art process and to provide easily and efficiently reliable and superior quality welded steel pipes.

While the invention has been described in relation to specific parts and arrangements of parts, other embodiments have been suggested and still other embodiments will occur to those skilled in the art. It is intended that all such embodiments be included within the scope of this invention as limited only by the scope of the appended claims.

What is claimed is:

1. A process for manufacturing a butt-welded steel pipe comprising the steps of detecting an edge portion temperature and a center portion temperature of a steel strip at a location between the outlet of a heating furnace and the inlet of a butt-welding mill in a forge-welded steel pipe manufacturing equipment, controlling the heating condition in the heating furnace in accordance with the difference between the edge portion temperature and a target edge portion temperature, and controlling the transporting speed of the steel strip in accordance with the difference between the difference in the detected edge portion temperature and the center portion temperature and a target difference between the edge portion temperature and the center portion temperature.

2. A process for manufacturing a butt-welded steel pipe as set forth in claim 1, in which, the heating condition in the heating furnace is controlled by adjusting gas flow supplied into the heating furnace.

3. A process for manufacturing a butt-welded steel pipe as set forth in claim 1, in which, the transporting speed of the steel strip is controlled by adjusting the rotational speed of drive motors in the butt-welding mill.

* * * * *